Jan. 6, 1942.　　　　F. B. RILEY　　　　2,269,127
VALVE
Filed March 17, 1939
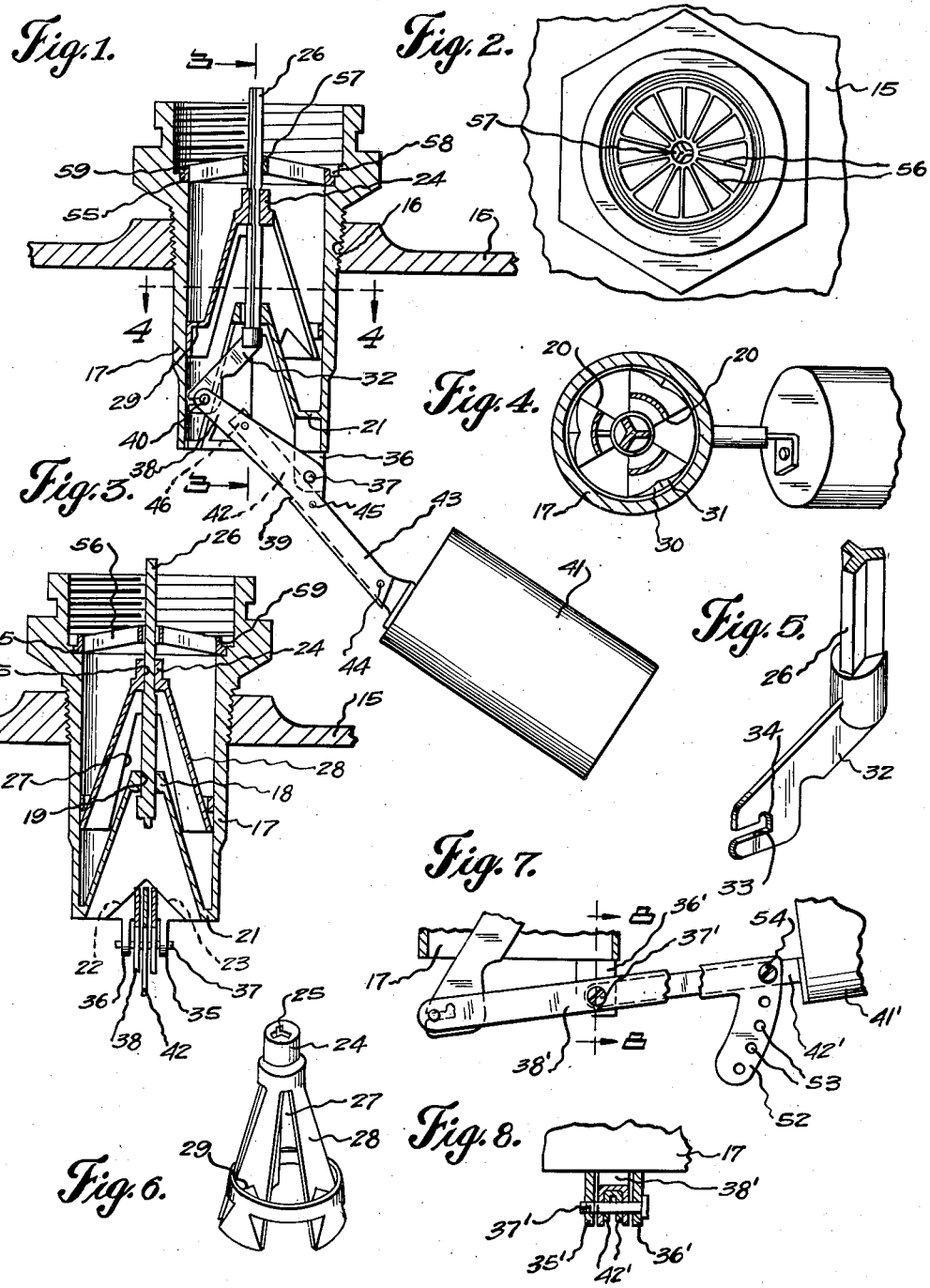

Patented Jan. 6, 1942

2,269,127

UNITED STATES PATENT OFFICE 2,269,127

VALVE

Francis B. Riley, Detroit, Mich.

Application March 17, 1939, Serial No. 262,445

3 Claims. (Cl. 137—104)

My invention relates to a new and useful improvement in a valve mechanism adapted particularly for use in connection with vessels or tanks into which liquid is delivered. The valve is intended for mounting in the inlet opening or in the conduit which serves to deliver liquid through the inlet opening into the container or tank. The invention particularly lends itself for use in connection with fuel storage tanks into which the fuel is delivered through a suitable feed line from a source of supply, the feed line being connected by a suitable connecting conduit to the source of supply. In the delivery of liquid into the tank from a source of supply under such circumstances the liquid is generally delivered under pressure, and the valve mechanism interposed in the line should be of such a construction that the flow of liquid will not move the valve into closed position. In view of the fact that in the field of such containers, there generally is no means of indicating the liquid level, the valve mechanism should be of a float-operated type so that as the liquid rises to a predetermined level in the tank, the valve will be moved to closed position by a float rising on the liquid delivered into the tank.

It is an object of the present invention to provide a valve mechanism of this type so arranged and constructed, that when moved to open position by the lowering of a float, the valve is locked in open position and remains so locked until the float is raised to release the locking mechanism.

Another object of the invention is the provision of a valve mechanism adapted for being interposed in an inlet opening of a delivery pipe through which liquid is delivered into a tank so arranged and constructed that when in open position no hindrance to the free flow of liquid through the delivery pipes or inlet openings is afforded.

Another object of the invention is the provision of a valve mechanism of this class so arranged and constructed that when raised to open position it may be locked in open position and released from locked position upon the raising of a float by the liquid delivered into the tank and provided with a mechanism whereby the relative position of the float may be adjusted so that the valve will be released for movement to closed position upon the rising of the float to various predetermined positions.

Another object of the invention is the provision of a valve mechanism of this class having a grid serving as a screen for preventing entry into the tank of foreign articles beyond a predetermined size.

Another object of the invention is the provision in a valve mechanism of this class of deflecting means for deflecting solid articles toward openings in the valve mechanism through which said foreign articles may pass into the tank.

Another object of the invention is the provision in a valve mechanism of this class of a pair of nesting cones having non-registering openings formed therein in such a manner that when the cones are moved to fully nested position, the openings in each of the cones will be closed by the solid body portions of the other cone.

Another object of the invention is the provision of a valve mechanism mounted in a tubular fitting in such a manner that a trap is provided for semi-liquid matter which may flow inwardly of the fitting.

Other objects will appear hereinafter.

The invention consists in the combination and arrangement of parts hereinafter described and claimed.

The invention will be best understood by a reference to the accompanying drawing which forms a part of this specification, and in which:

Fig. 1 is a central, longitudinal, vertical, sectional view of the invention showing it applied.

Fig. 2 is a top plan view of the invention shown in Fig. 1.

Fig. 3 is a sectional view taken on line 3—3 of Fig. 1.

Fig. 4 is a sectional view taken on line 4—4 of Fig. 1, with a part broken away.

Fig. 5 is an enlarged fragmentary perspective view of a stem and actuating member used in the invention.

Fig. 6 is a perspective view of the outer cone used in the invention.

Fig. 7 is a fragmentary sectional view illustrating, in side elevation, a modified form of mounting of the float with parts broken away.

Fig. 8 is a sectional view taken on line 8—8 of Fig. 7.

In the drawing, I have illustrated the invention used with a container or tank 15, having threaded inlet openings 16 formed therein. In the present embodiment, I have illustrated a valve mechanism mounted in a tubular shell or casing 17 which forms a fitting which may be threaded into the openings 16 and which projects at its inner end beyond the inner face of the tank or container 15. Mounted so as to terminate substantially flush with the inner end of the fitting 17 and extending axially inwardly of the fitting 17 is an inner cone. The large end of this inner cone is secured by welding, soldering, or in any other suitable manner, to the inner surface of the fitting 17. The cone is truncated and at its truncated end it is provided with an enlarged body or head 18 having a central opening 19 formed therein. This cone is also provided with a plurality of elemental slots 20 extending from the head 18 toward the open end of the cone, but terminating within marginal limits thereof to provide a ring 21 extending around the same so that a solid, uninterrupted body is provided for securing to the inner face of the fitting 17. These slots 20 are in spaced relation to each other, the slots 20 being separated by a part of the cone body substantially equivalent in area to the area of the slots. The combined area of these slots is slightly larger, or at least as large, as the cross-sectional area of the fitting 17, the body portion of this cone lying between the slots 20 forming blade-like members. Adjacent the end of the cone, these members are pressed outwardly as at 21 to provide a pyramidal ledge having the inclined surfaces 22 and 23. This ledge serves as a deflecting member for deflecting solid particles which may pass downwardly and strike thereagainst and the inclined surfaces 22 and 23 will deflect these particles toward the openings 20 formed in the inner cone so that the solid particles may pass through the openings 20 into the interior of the tank 15. This stationary cone serves as a valve seat and a movable cone is used as a valve body. These cones are positioned within the fitting 17 in telescoping relation, as clearly appears from Fig. 1 and Fig. 3. The outer or movable cone is truncated and provided with a head 24 having central openings 25 formed therein through which is projected a rod 26, this rod being welded or otherwise suitably secured in fixed relation to the head 24, so that upon longitudinal movement of this rod 26, the outer cone is moved axially. This rod also extends through the head 18, the head 18 serving as a guide for the rod 26 in its movements. The outer cone is provided with a plurality of elemental openings 27 which are in spaced relation to each other and which terminate inwardly of the open edge of the cone so that there is a ring of material surrounding the open end of the cone. These openings 27 are in staggered or non-registering relation to the openings 20 formed in the stationary cone, so that when the cones are brought into fully nested position, the blade-like portions 28 of the outer cone, which form the body between the slots 27 will cover the openings 20 formed in the stationary cone, and the inner cone lying between the slots 20 will serve to cover the openings 27 of the sides of the movable cone. Consequently, when the cones are moved into fully nested position, passage of liquid through the fitting 17 would be prevented. When the cones are in fully opened position, passage of liquid through the fitting 17 would be unimpeded, as the combined area of the slots 27 is at least equal to the cross-sectional area of the fitting 17.

A deflecting ledge is formed on each of the blade-like portions 28 of the inner or movable cone. By pressing the material outwardly, as at 29 there is provided a pyramidal ledge having the inclined surfaces 30 and 31 which would serve to deflect solid particles such as pebbles, and the like, striking thereon laterally toward the slots 27 to permit their passage downwardly to the tank 15.

Mounted on the lower end of the rod 26 and stationary relatively thereto, is an operating link 32 having a slot 33 formed in its end terminating at its inner end with an upwardly directed recess or pocket 34. Projected outwardly from the end of the fitting 17 is a pair of spaced lugs 35 and 36 between which are pivotly mounted by means of a pin 37 a lever 38, this pin 37 passing through the lugs 35 and 36 and through the lever 38 intermediate its ends. This lever 38 is channel-shaped at its rear end, the bottom thereof being cut off as at 39 to provide the spaced extension of the side walls. These side walls are adapted to embrace the link 32 and carry a stud 40 which rides in the slot 33. A suitable float 41 is provided extending outwardly from which is an arm 42 which lies in the trough portion 43 of the lever and which is secured thereto by pins 44 and 45. This arm 42 is fixed at one end to the end of the float 41. The construction is such that the float 41 may be raised and lowered through a rocking of the lever 38 on its pivot 37. If the float 41 is to be raised, the lever 38 would be rocked on its pivot so as to move the rod 26 downwardly. Consequently, as the liquid in the tank 15 rises to a predetermined level, the float 41 will be raised and as this float rises upwardly the cones will be brought into fully nested position, thus moving the valve into fully closed position. By adjusting the longitudinal position of the arm 42 on the lever 38, the operation of the valve to open and closed position in response to the rising and lowering of the float 41 may be adjusted to various heights of liquid. By moving the float 41 outwardly so that the pin 45 projects through the opening 46 in the arm 42 the float 41 would be depended a greater distance from the end of the fitting 17, and consequently, the valve would be moved to closed position, when the liquid rises to a predetermined level, and to which it would have to rise in order to move the valve in closed position, with the parts arranged, as shown in Fig. 1.

As the float 41 moves downwardly, upon a lowering of the liquid level in the tank 15, the outer or moveable cone, which constitutes the valve, would be moved away from the valve seat, or stationary cone, and this movement, of course, would be a gradual movement, so that the valve would gradually move toward fully opened position. As the liquid level lowers, and this valve movement is effected, any liquid in the fill pipe connected to the fitting 17, would, of course, drain into the tank 15. When the liquid level lowers, and the float 41 moves to its limit of downward movement, the stud 40 will lie in registration with and engage in the pocket or recess 34. With this stud 40 engaging in the pocket or recess 34, the moveable cone will be locked against movement and pressure exerted on it directed inwardly of the fitting 17 would be resisted so that the moveable or outer cone is thus locked in open position. Consequently, the pressure exerted upon the valve by the liquid being delivered into the tank 15 through the fitting 17 could not move this valve in closed position, relative to its seat. It is necessary first that the stud 40 be disengaged from the pocket or recess 34. This can only be effected by a rocking of the lever 38, that is by a raising of the float 41. It is consequently seen that the valve is float operated and moves to open position through the action of the mechanism operated by the float, and that when in fully opened position, this mechanism serves to lock the valve in fully open position and retain it in this position until the float, itself, is caused again to rise. As the float rises, it positively moves the moveable cone into closing position, and a simple and highly efficient valve mechanism of this type for this purpose is thus provided.

In Figs. 7 and 8, I have shown a modified form of operating mechanism. In this construction, a lever 38' is mounted on the stud 37' which passes through the lugs 35' and 36'. This stud or bolt 37' also passes through the arm 42' which is secured at one end to the tank 41' and projects outwardly therefrom. Carried by the arm 38' is an arcuate extension 52 having a plurality of openings 53 formed therein lying in an arcuate formation. A screw 54 passes through one of these openings 53 and also through the arm 42'. By adjusting the position of the arm 42' relatively to the arm 38' which is determined by the openings 53 through which the screw 54 is projected, when projected through the arm 42', the mechanism is adjusted by opening and closing the valve depending upon the rising of the liquid in the tank to various predetermined heights.

Mounted in the fitting 17 is a grid or spider comprising a ring 55 connected by the radially extending blades 56 to a hub 57 which also serves as a guide for the rod 26. The upper side of the ring 55 is cut away as at 58 to provide a channel 59 surrounding this ring so that passage of foreign material of a semi-liquid nature such as filings, white lead, or the like, will be entrapped in the channel 59 and prevented from passing into the valve mechanism. In this way I have provided a simple and effective construction in which the easy, safe, and convenient filling of the tanks will be effected, and to which all of the disadvantages referred to are avoided, and the various advantages sought are attained.

It is recognized that various modifications and changes may be made in the detail of structure, without departing from the spirit of the invention, and the novel features embodied therein, and it is intended that such modifications, variations, and changes shall be embraced in the scope of the claims appended hereto.

What I claim as new is:

1. A valve mechanism of the class described, comprising: a conduit; a conical valve seat mounted in said conduit and having a plurality of spaced openings formed therein; a conical valve moveably mounted in said conduit, and moveable into engaging nesting relation with said valve seat, said valve having a plurality of spaced openings formed therein, said valve seat effecting a closing of the openings in said valve, and said valve effecting a closing of said openings in said seat upon movement of said valve into nesting engaging relation with said seat; a float swingably mounted on said conduit, and adapted to be positioned within a tank, to move in response to the raising and lowering of liquid level in the tank; means operable upon the raising and lowering of said float for moving said valve into and out of engagement with said seat; means carried by said moving means adapted for locking said valve in non-engaging position with said seat, and releasable only upon the raising of said float; and deflecting means carried by said valve for deflecting solid particles toward the openings therein.

2. A valve mechanism of the class described, comprising: a conduit; a valve seat mounted in said conduit and having a plurality of spaced openings formed therein; a valve moveably mounted in said conduit, and moveable into engaging nesting relation with said valve seat, said valve having a plurality of spaced openings formed therein, said valve seat effecting a closing of the openings in said valve, and said valve effecting a closing of said openings in said seat upon movement of said valve into nesting engaging relation with said seat; a float swingably mounted on said conduit, and adapted to be positioned within a tank, to move in response to the raising and lowering of liquid level in the tank; means operable upon the raising and lowering of said float for moving said valve into and out of engagement with said seat; means carried by said moving means adapted for locking said valve in non-engaging position with said seat, and releasable only upon the raising of said float; deflecting means carried by said valve for deflecting solid particles toward the openings therein; and deflecting means carried by said valve seat for deflecting solid particles toward the openings therein.

3. A valve mechanism of the class described, comprising: a conduit adapted for mounting in a liquid receiving vessel; a valve seat mounted on said conduit; a valve moveable relatively to said seat and adapted, upon engagement therewith, for closing passage to said conduit; a toggle mechanism pivotally mounted at one end on said conduit and connected at its opposite end to said valve and normally broken away from center, the movement of said toggle toward center effecting an opening of said valve; a float; means carried by said float for, upon raising and lowering of said float, actuating said toggle mechanism for closing and opening said valve; and means associated with and engageable by said toggle mechanism and releasable only upon the raising of said float for, upon movement of said valve to open position, securing said toggle against further movement.

FRANCIS B. RILEY.